Figure 1:
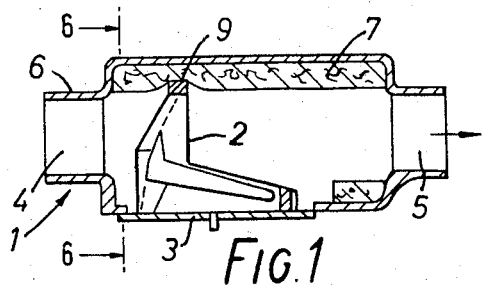

United States Patent [19]
Valbjorn et al.

[11] 3,872,946
[45] Mar. 25, 1975

[54] DUCT SYSTEM WITH BUILT-IN VOLUME REGULATOR

[75] Inventors: Knud Vagn Valbjorn, Nordborg; Volker Spies, Augustenborg; Poul Christian Dyhr-Mikkelsen, Sonderborg, all of Denmark

[73] Assignee: Danfoss A/S, Nordborg, Denmark

[22] Filed: Feb. 4, 1974

[21] Appl. No.: 439,650

[30] Foreign Application Priority Data
Feb. 6, 1973 Denmark.............................. 608/73

[52] U.S. Cl. .................................. 181/36 B, 137/375
[51] Int. Cl. .............................................. F01n 3/06
[58] Field of Search .... 181/36 R, 36 B, 35 R, 33 K, 181/50; 137/326, 375; 98/114, 41 R

[56] References Cited
UNITED STATES PATENTS
3,139,106  6/1964  Wallin.................................. 137/375

Primary Examiner—Richard B. Wilkinson
Assistant Examiner—John F. Gonzales

[57] ABSTRACT

The invention relates to an air volume regulator assembly of the type used in the ducts of heating and cooling systems. A duct section is provided having walls on three sides thereof and a removable wall portion. A damper type regulator unit is mounted on the wall portion and is thereby easily removable for inspection and repair. A U-shape portal in the duct section is in spaced relation to the three walls and is in surrounding relation to the regulator unit. Sound absorbing material is between the portal and the three walls. In the illustrated embodiment of the invention the portal is attached to the removable wall portion.

4 Claims, 6 Drawing Figures

PATENTED MAR 25 1975            3,872,946

DUCT SYSTEM WITH BUILT-IN VOLUME REGULATOR

The invention relates to a duct system with a volume regulator for control of the volume of air, comprising a sound trap internally fitted with sound-absorbing material.

It is already known in duct systems that the volume regulator is fitted in a housing which also serves as sealing faces of the movable damper regulating the volume of air. Such volume regulators are often fitted in connection with a sound trap the object of which is to absorb the noise arising from throttling of the air. Therefore, the volume regulator is flange-connected to the duct system, and such a connection has the drawback that the volume regulator must be removed from the duct system for inspection and repair, which requires axial displacement of the ducts or disconnection of two assemblies, because the volume regulator is screwed into the duct system as an integral part.

Sound traps are also already known, also forming an integral part of a duct system in which the volume regulator is fitted inside the sound trap which has an inspection cover. However, this assembly method has also drawbacks because - in case of repair or checking of the setting of the volume regulator - the inspection cover will have to be removed first to allow removal of the volume regulator from inside the sound trap, the latter operation being an intricate job as there is never much space in such cases.

The object of the invention is to specify a duct system in which a volume regulator has been fitted in connection with a sound trap in a way greatly facilitating inspection and assembly of regulator and sound trap as a unit.

According to the invention this is obtained by providing the sound trap with an inspection cover which is the baseplate of the volume regulator and the damper unit, the inspection cover assemblies forming an integral regulator unit and sound trap.

What is obtained is that the volume regulator plus damper can easily be fitted in and removed from the duct system. Further, special assembly devices are avoided between the volume regulator and the sound trap, and the simplification makes the system specified cheaper than systems known already.

According to the invention it is a further advantage that the portal on the side facing away from the damper has a sealing material, preferably rubber. This ensures that the air in the duct system does not bypass the regulator and that possible fluctuations of the air flow are not transmitted to the regulator, influencing its operation.

Further, according to the invention, the portal may have a projection to which the sealing material can be fixed.

According to the invention it is also an advantage that the sealing material has a cross-section which is preferably square, and that the seal is tongued and grooved to the portal, facilitating assembly.

According to the invention it is a further advantage that the seal of the portal makes a full contact with the sound-absorbing material of the sound trap. This ensures a tight seal between the volume regulator and the sound trap, so that the regulated air will have to pass through the regulator and can never bypass the latter.

The invention is specified below with reference to the drawing, showing in

Figure 6:
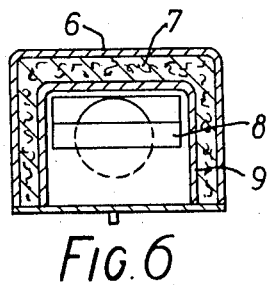
Figure 2:
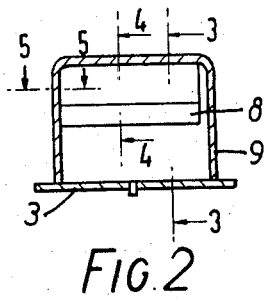
Figure 3:
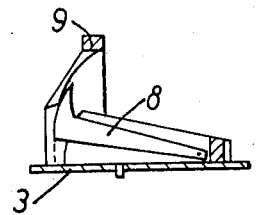
Figure 4:
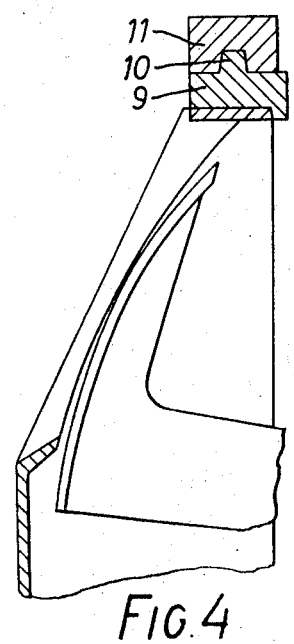
Figure 5:
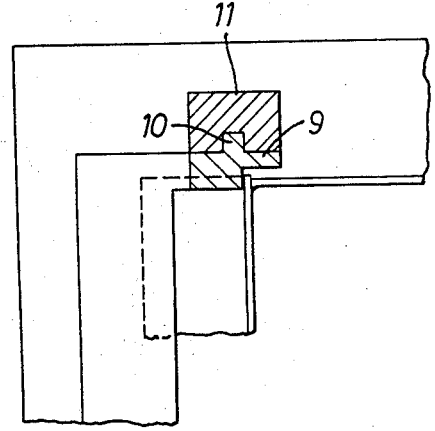

FIG. 1 shows a volume regulator and sound trap assembled in one unit,

FIG. 2 shows the volume regulator seen from the end, the damper being encased in a portal, FIG. 3 is a section of the volume regulator taken on line 3—3 in FIG. 2, FIG. 4 is section 4—4 in FIG. 2 enlarged, FIG. 5 is section 5—5 in FIG. 2 enlarged, FIG. 6 is section 6—6 of the sound trap with the volume regulator.

1 is a sound trap with a built-in volume regulator 2. The sound trap has an inspection cover 3 on which the volume regulator 2 is mounted. The inspection cover is attached to the sound trap 1 by means of screws, which are not seen here. The sound trap 1 has an inlet pipe stub 4 and an outlet pipe stub 5. 6 is the housing of the sound trap, and 7 is the soundabsorbing material with which the sound trap is lined. The regulator 2 is mounted on the inspection cover 3, possibly welded or screwed on. The regulator has a damper 8, pivotally mounted. A portal 9 is fitted to the inspection cover 3 and encases the pivotally mounted damper 8. Further, the portal 9 has a projection 10, and the portal 9 is surrounded by a sealing material 11, preferably rubber, which has a groove corresponding to the tongue 10 of the portal. Via the pipe stubs 4 and 5 the sound trap 1 can be connected to a duct system not shown here. The inspection cover of the sound trap being the assembly base of the volume regulator the latter can very easily be fitted and removed without disassembling any assemblies. The portal 9, encasing the volume regulator and having the sealing material 11, makes a full contact with the sound-absorbing material 7 of the sound trap, preventing air from bypassing the volume regulator. If a re-setting of the volume regulator is desired, all that has to be done is to remove the inspection cover 3. The regulator itself will come out at the same time, it can be adjusted outside the sound trap and be replaced, fully operative.

What we claim is:

1. An air volume regulator assembly comprising a duct section open at opposite ends thereof and having wall means on three sides thereof, a removable wall portion, a regulator unit mounted on said wall portion, a U-shaped portal attached to said removable wall portion in surrounding relation to said regulator unit, sound absorbing material having a U-shaped section attached internally to said three sides of said wall means, said sound absorbing material being deformed by said portal when in an assembled position.

2. An air volume regulator assembly according to claim 1 wherein a seal is on said portal and in engaging relation to said sound absorbing material.

3. An air volume regulator assembly according to claim 2 wherein said portal has a projection to provide a mounting edge for said seal.

4. An air volume regulator assembly according to claim 3 wherein said seal has a generally rectangular cross section and has a groove for receiving said portal projection.

* * * * *